United States Patent
Prinzhausen et al.

(10) Patent No.: US 6,940,610 B2
(45) Date of Patent: Sep. 6, 2005

(54) OPTICAL MEASURING DEVICE

(75) Inventors: Friedrich Prinzhausen, Esslingen (DE); Michael Lindner, Leutenbach (DE)

(73) Assignee: Robert Bosch GmbH, Stuttgart (DE)

( * ) Notice: Subject to any disclaimer, the term of this patent is extended or adjusted under 35 U.S.C. 154(b) by 517 days.

(21) Appl. No.: 10/145,523

(22) Filed: May 14, 2002

(65) Prior Publication Data
US 2003/0002054 A1 Jan. 2, 2003

(30) Foreign Application Priority Data
May 14, 2001 (DE) ......................................... 101 23 299

(51) Int. Cl.[7] ............................................. G01B 11/24
(52) U.S. Cl. ..................................... 356/609; 359/368
(58) Field of Search ........................... 356/237.1–237.5, 356/601–614, 624; 359/368, 388

(56) References Cited

U.S. PATENT DOCUMENTS

| | | | |
|---|---|---|---|
| 4,170,398 A | | 10/1979 | Koester |
| 4,600,831 A | * | 7/1986 | Hutley ..................... 250/201.4 |
| 4,884,881 A | * | 12/1989 | Lichtman et al. ........... 359/227 |
| 5,295,477 A | * | 3/1994 | Janfaza ....................... 600/142 |
| 5,496,261 A | * | 3/1996 | Sander ....................... 600/163 |
| 5,659,642 A | | 8/1997 | King et al. |
| 6,031,661 A | * | 2/2000 | Tanaami ..................... 359/368 |
| 6,157,484 A | | 12/2000 | Nishida |
| 6,580,518 B2 | * | 6/2003 | Eda et al. ................... 356/609 |
| 6,731,383 B2 | * | 5/2004 | Watkins et al. .......... 356/237.2 |

FOREIGN PATENT DOCUMENTS

| | | |
|---|---|---|
| DE | 195 29 788 | 3/1996 |
| JP | 02000275027 A | * 10/2000 |
| WO | WO 99/42885 | 8/1999 |
| WO | WO 00/16151 | 3/2000 |

OTHER PUBLICATIONS

Paddock, S.W., "Confocal Laser Scanning Microscopy", Bio Techniques; vol. 27, No. 5, pp. 992–1004, Nov. 1999, Described in the Specification.

Naumann/Schroder: Bauelemente der Optik, Carl Hanser Printing House, Munich, Vienna, 6th Edition, p. 349, Described in the Specification.

Isailovic: Videodisc and Optical Memory Systems, Prentice– Hall Inc., 1985, Described in the Specification.

R. Juskaittis et al. "Confocal Microscopy Using Optical Fiber Imaging Bundles", Proceedings of the SPIE—The International Society For Optical Engineering, 1996, Bd. 2655, pp. 92–94.

* cited by examiner

*Primary Examiner*—Hoa Q. Pham
(74) *Attorney, Agent, or Firm*—Kenyon & Kenyon

(57) ABSTRACT

The present invention relates to an optical measuring device (1) for measuring the shape of particularly rough surfaces of a test object (O), the measuring device including a device that has at least one light source (LQ), one illumination optics, one measuring optics, and at least one detection unit, for determining the intensity distribution of a measuring beam reflected from the surface as a function of a focus position relative to the object surface. A simple measurement even of highly inaccessible locations on the test object is made possible by the fact that the measuring optics has an optical probe for generating at least one intermediate image (ZW) of the observed surface area (FIG. 1).

26 Claims, 8 Drawing Sheets

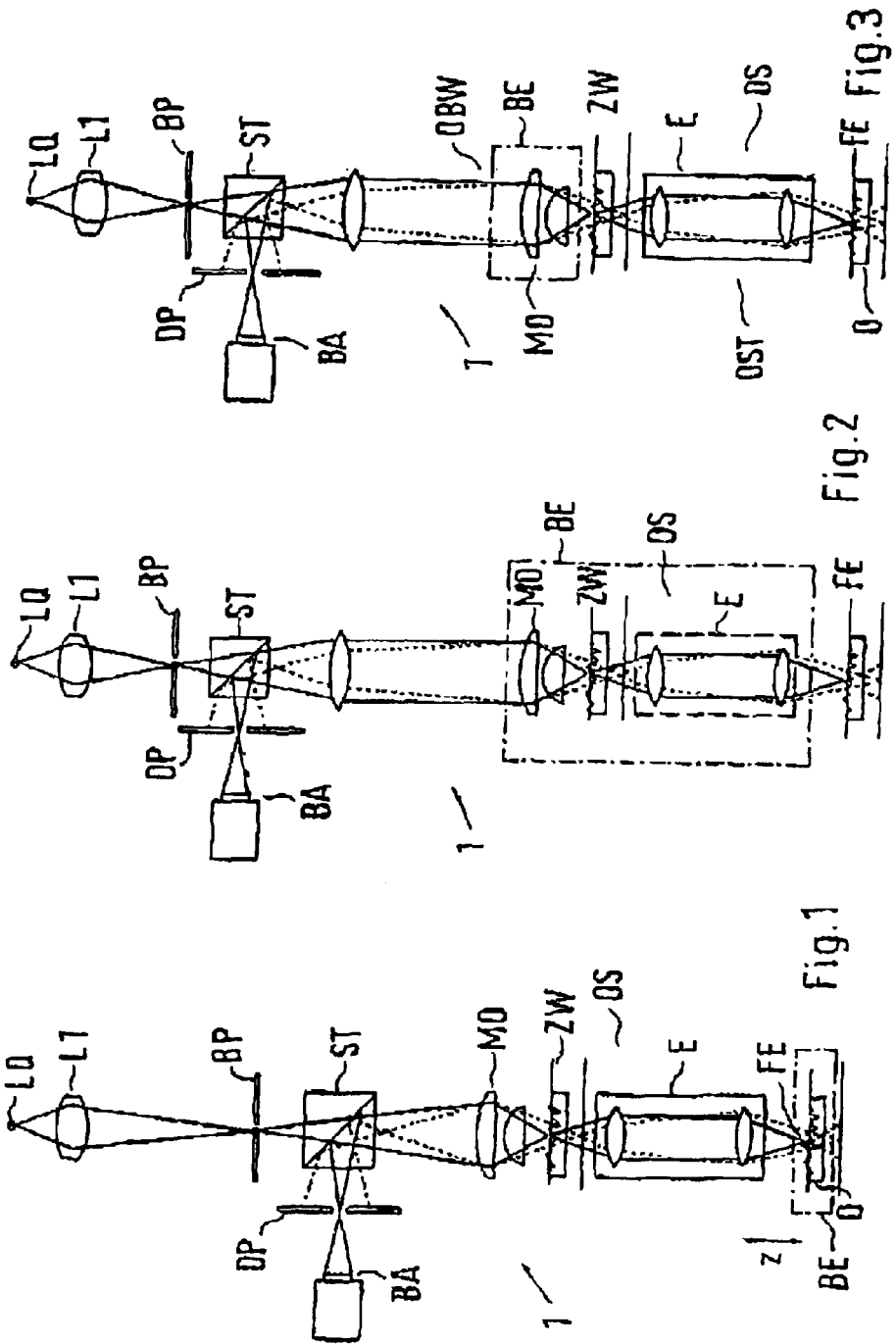

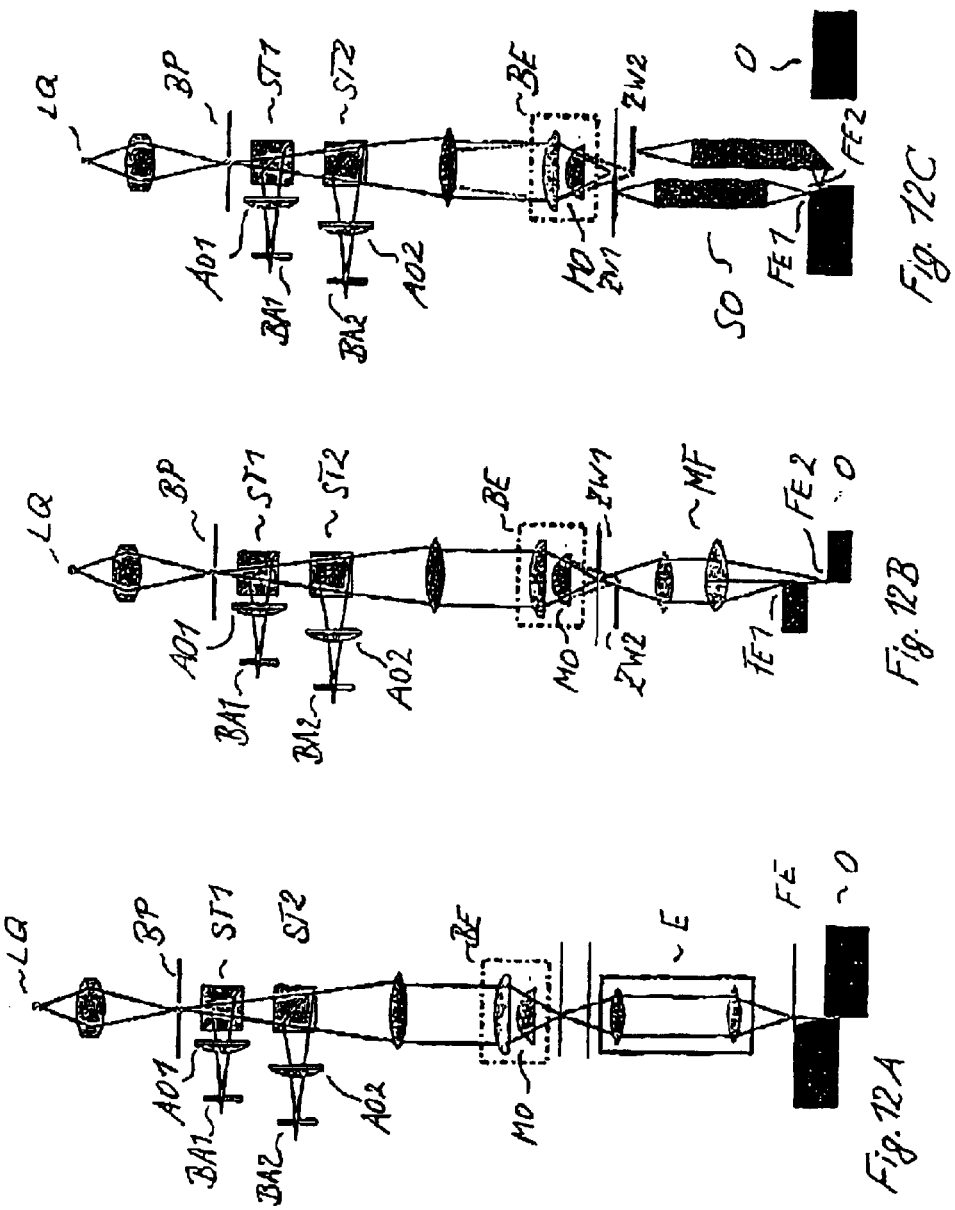

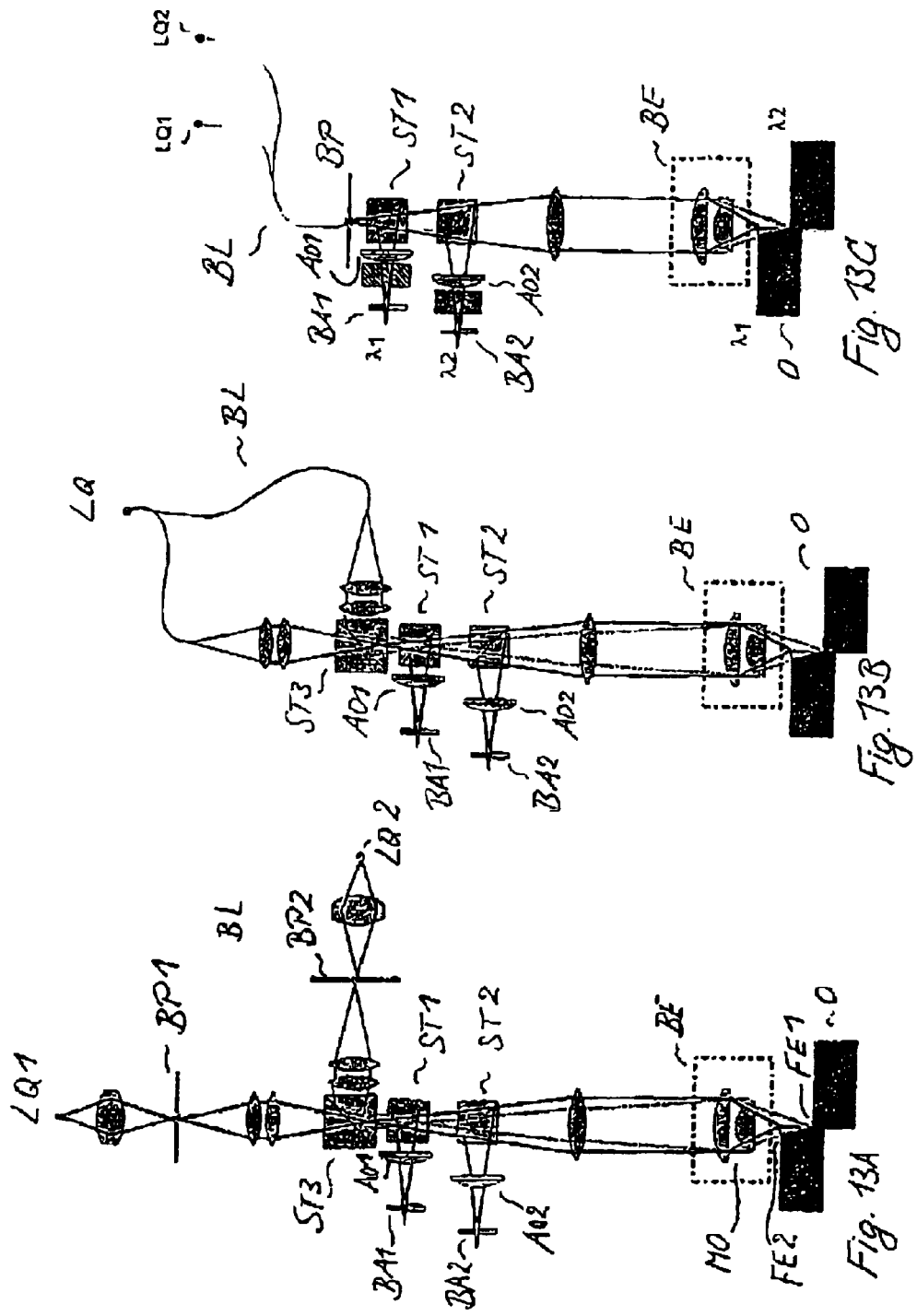

OPTICAL MEASURING DEVICE

Figure 4A:
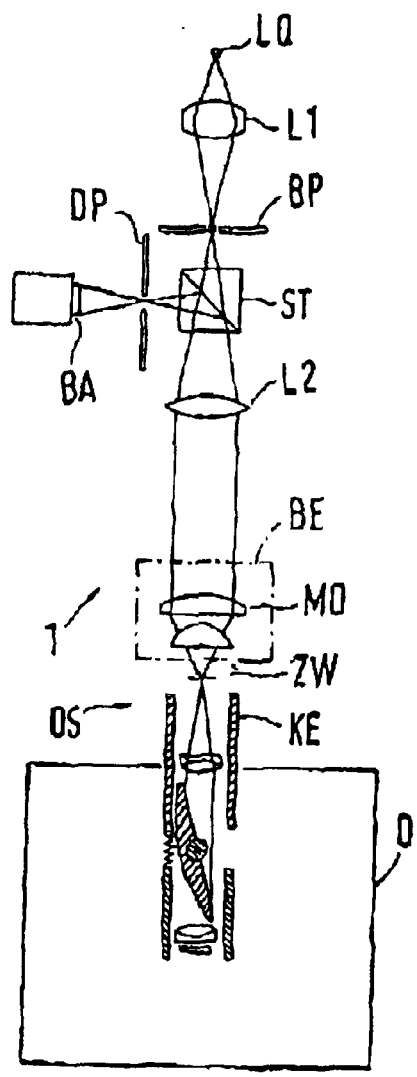

The present invention is directed to an optical measuring device for measuring the shape of particularly rough surfaces of test objects, the optical measuring device having a unit containing at least one light source, one illumination optics, one measuring optics, and at least one detection unit having a detection element, for producing a focus on the surface, for imaging the focus reflected by the surface using the measuring optics onto the detection element, and for determining the intensity distribution of the imaged focus on the detection element, such that the intensity distribution is a function of the focus position of the measuring optics relative to the surface, and from the result of one or a plurality of different intensity distributions, the position or shape of the observed surface area can be determined through a signal evaluation.

BACKGROUND INFORMATION

In this type of optical measuring device known as a confocal microscope, a test object is illuminated, for example, through a microscope objective by a patch of light. The patch of light is situated in the focal plane of the microscope objective. This plane, the so-called focal plane of the microscope objective, is once again imaged through the microscope objective into an image plane where an aperture (pinhole) is located. Situated behind this detection aperture is a photodiode, or image recorder.

For purposes of 3D-measurement, the object surface is moved (scanned) in the depth axis (z-axis) through the focal plane. If the object surface lies in the focal plane, then the patch of light is imaged sharply onto the detection aperture, and the photodiode measures a high intensity signal. If, on the other hand, the surface lies outside of the focal plane, then an unsharp image of the patch of light is formed on the detection aperture, and the photodiode measures a weak intensity signal. Various methods have been established for moving the test object through the focal plane for purposes of 3D measurement. For example, in a commercial confocal microscope, the test component is placed on a piezo-unit that performs the depth scanning, or specific components, together with the microscope objective, perform the depth scanning. Heretofore, confocal microscopy has been predominantly used for measuring planar objects or in the field of biology, as is shown in S. W. Paddock, "Confocal Laser Scanning Microscopy," Bio Techniques, Vol. 27, No. 5, pp. 992–1004, November 1999.

A further measuring device of this type is configured as an autofocus system. In this context, just as in the aforementioned confocal microscope, the test object in the observed area is illuminated by a patch of light via an illumination optics and a measuring optics. The focal plane is once again supplied via the measuring optics to the detection unit, in which an astigmatic optics is arranged for producing an image on the image recorder. The image, as a function of the position of the observed area relative to the focal plane, has varying local distribution patterns of intensity, from which using a locally resolving image recorder the position of the observed area can be determined. Heretofore, autofocus systems of this type have been used in cameras for automatic sharp focussing or as distance sensors in CD-playing devices. For the design of an autofocus system, reference is made to Naumann/Schröder: Bauelemente der Optik, Carl Hanser Printing House, Munich, Vienna, 6th Edition, p. 349, and to Isailovic': Videodisc and Optical Memory Systems, Prentice-Hall Inc., 1985.

If the test object is illuminated by a patch of light, it must then still be scanned in the xy-direction. For this, various related-art techniques have also become widely accepted, such as beam folding using oscillating mirrors, moving the object in the xy-direction relative to the measuring system. When a Nipkow disk and a CCD camera are used, areal measurements of the objective surface can likewise be taken.

An alternative measuring device is configured as a Foucault laser. In this context, a parallel light beam is generated by a laser. This beam is focused via an optics (objective optics). In the illumination light path, an aperture (Foucault knife edge) is used, so that the laser beam cannot spread out in passing through the entire opening of the objective optics. The focused light is reflected back by the object and can pass, in the detection light path, through the full opening of the objective optics. Via a beam splitter, which is situated between the objective optics and the Foucault knife edge, the reflected light via a second optics (detection optics) is conveyed onto a locally resolving image recorder. By using the Foucault knife edge in the illumination light path, the image of the focus from the surface of the object has varying distribution patterns of intensity as a function of the position of the observed area of the object surface relative to the focal plane of the objective optics. From this varying local distribution of intensity, which is established and evaluated using the image recorder (e.g., CCD camera, four-quadrant diode, differential diode, etc.), the position of the observed area of the surface can be determined. Because the object is illuminated using only one patch of light, it must still be scanned in the xy-direction. For this, various techniques have established themselves in accordance with the related art (e.g., moving the object relative to the light beam, beam folding using oscillating mirrors, etc.).

If measurements are to be taken, for example, in narrow cavities, then difficulties arise when a confocal microscope is used.

In contrast to interferometric optical measuring devices in narrow cavities, e.g., as in white light interferometry, where it is necessary to assemble a relatively expensive reference arm having properties nearly identical to those of the object arm, a confocal microscope has a simple and cost-effective design.

The underlying object of the present invention is to devise an optical measuring device of the type mentioned at the outset which will enable surface measurements of a test object to be taken even at poorly accessible locations, such as in narrow cavities.

SUMMARY OF THE INVENTION

This objective is achieved by the features of claim 1. According to these features, the measuring optics has an optical probe for generating at least one intermediate image (ZW) of an observed surface area.

This design of a confocal microscope having the optical probe which includes the intermediate-imaging device facilitates measuring tasks, enabling them to be performed quantitatively, non-destructively, quickly, at high resolutions, in a contact-free manner, as well as simply and cost-effectively, even, for example, in narrow cavities or channels.

One favorable refinement provides for the intermediate image or at least one of the intermediate images to be generated in the object beam path.

Alternative design possibilities are derived in that the optical probe on the object side of an objective optics is arranged in the reflected object beam, it being possible to configure the objective optics as a microscope objective, in order to achieve, e.g., a high lateral resolution, or in that the optical probe includes an optical system designed as a microscope objective. The first variant is suited, for example, for redesigning an existing confocal microscope, while the second variant is particularly suited for reconstructing a confocal microscope.

A simple design is also promoted by the fact that an illumination aperture is provided, and the optical probe images the illumination aperture in its focal plane.

The intermediate image is generated and scanned in simple manner in that an optical unit, which is rigid in relation to the test object, is located in the measuring beam and is followed on the side distant from the test object by an optical unit which is movable in relation to the test object, in the direction of its optical axis during depth scanning. In this context, one simple embodiment provides for an intermediate image, which is rigid in relation to the test object, to be generated by the rigid optical unit normally to the optical axis, and for the movable optical unit to be positioned in the reflected object beam behind the rigid intermediate image and to be designed to scan the latter.

Uneven or unfavorably oriented surfaces of the test object may be easily converted into an even intermediate image and be scanned, in that the rigid optical unit has wavefront-deforming elements.

A design that is favorable in terms of simplicity of operation and reliability of performance provides for the rigid optical unit to be fully or partially designed as an endoscope.

An additional favorable embodiment is derived in that the rigid optical unit is part of an optical system that generates the intermediate image or an additional intermediate image.

Alternative design possibilities are derived in that the movable optical unit is made fully or partially of optical elements which are movable in the direction of the optical axis and, furthermore, in that the movable optical unit is situated fully outside of, partially inside and outside of, or fully inside of the object's light path.

A precise measurement is reinforced in that the intermediate-imaging device has the same linear magnification for all object points imaged in the rigid intermediate image and, additionally, in that the intermediate-imaging device is designed as a telecentric imaging device in a 4F configuration.

A system of confocal apertures can be provided that includes, for example, pinhole diaphragms, slit diaphragms, slit gratings or a Nipkow disk. It is advantageous, e.g., that the confocal system of apertures have an illumination aperture and a detection aperture, which are positioned at optically conjugate locations of the beam path of an illumination unit having a light source and of a detection unit, that as a function of the focus position relative to the surface, varying local intensity distributions arise on the detection element, and that the position or shape of the observed surface area can be determined from the varying intensity distributions using a signal evaluation unit of the detection unit.

In the confocal system of apertures, an additional measure results from the fact that the optical probe also images the detection probe in the focal plane.

The measuring device can advantageously be designed so as to have an autofocus system such that the detection unit has an astigmatic optics for generating an astigmatic image of the observed object surface on a receiver surface of the detection unit, that the astigmatic optics be configured and arranged such that, as a function of the focus position relative to the object surface, varying local intensity distributions arise on the receiver surface, and that the position or shape of the observed surface area can be determined from the differing local intensity distributions using a signal evaluation unit of the detection unit.

In this context, one design that is favorable for a precise measurement of the object surface is reflected in the fact that the astigmatic optics has a cylinder lens or torus lens, and the receiver surface is a four-quadrant photo diode or an image recorder having an areal arrangement of image recording elements or an image recording arrangement made up of a plurality of rows of image recorders, and that the arrangement of the astigmatic optics and the receiver surface be such that for a focal plane situated in front of the observed surface area, a first orientation of the intensity distribution results, for a focal plane situated behind the observed surface area, a second orientation of the intensity distribution results, and for a focal plane situated in the observed surface area, a balanced intensity distribution results.

The measuring device can advantageously be configured as a Foucault laser such that the illumination light path contains an aperture, which brings it about that, for the illumination of the object, the entire diameter of the objective optics is not exposed to the beam, but that in casting an image of the object onto the image recorder, the entire diameter of the objective optics is exposed to the beam. In this context, the coverage of the diameter is preferably arranged so as to be asymmetrical. Furthermore, the aperture is arranged so that, as a function of the focus position relative to the object surface, varying local intensity distributions arise on the receiver surface, and that the position or shape of the observed surface area can be determined from the varying local intensity distributions using a signal evaluation unit of the detection unit. The aperture is preferably configured as a Foucault knife edge.

In this context, one design that is favorable for a precise measurement of the object surface is reflected in the fact that the receiver surface is an image recorder having an areal arrangement of image recording elements or a four-quadrant photo diode, or a differential diode, and that the arrangement is designed such that for a focal plane situated in front of the observed surface area, a first orientation of the intensity distribution results, for a focal plane situated behind the observed surface area, a second orientation of the intensity distribution results, and for a focal plane situated in the observed surface area, a balanced intensity distribution results.

The accessibility of unfavorably situated measuring locations is improved in that the optical probe has at least two sections which are able to swing out relative to one another about an axis, transversely to the optical axis, or be displaced relative to one another, transversely to the optical axis, and be arrested in a swing or displacement position.

In order to be able to simultaneously measure different surface areas using the same measuring device and to be able to generate a position relationship between the different surface areas, one advantageous embodiment proposes that the measuring optics have a superposition optics, through which surface areas of the test object that are separated spatially are illuminated and are imaged as intermediate images in one image field of a common intermediate image plane or in image fields of different intermediate image planes.

In this context, different embodiments are generated by the fact that the superposition optics is made up of different individual lens systems, and it images the spatially separated surface areas along different optical axes and/or different optical path lengths in the common intermediate image plane, or that the superposition optics has a multifocal optics having a lens that has a plurality of focal distances along one or a plurality of optical axes, and it images the spatially separated surface areas in the common intermediate image plane.

One further beneficial embodiment for measuring different surface areas derives from the fact that a plurality of detection units is provided each having an astigmatic optics and each having an image recorder in tuned, different image planes.

Different surface areas can be distinguished and measured in a simple manner by providing a plurality of illumination light paths with a plurality of illumination apertures and/or with light of differing wavelengths.

If it is provided that the measuring optics has an image-flattening optics for producing a flattened intermediate image of at least one uneven surface area, then it is possible to measure also uneven surface areas easily and precisely. In this context, it is additionally possible to measure, e.g., even circumferential wall areas of a cavity or annular surface areas using simple means by configuring the image-flattening optics as a optics.

Measuring using a depth scan takes place in that for determining the position and shape of the observed surface area, a relative change in the position of the focal plane with respect to the surface area is carried out in the z direction, either through a motion of the test object relative to the measuring device or through a motion of the objective optics having the optical probe relative to the surface or through a motion of the objective optics as a movable optical unit relative to the surface and to the optical probe as a rigid optics unit.

DRAWINGS

Figure 4B:
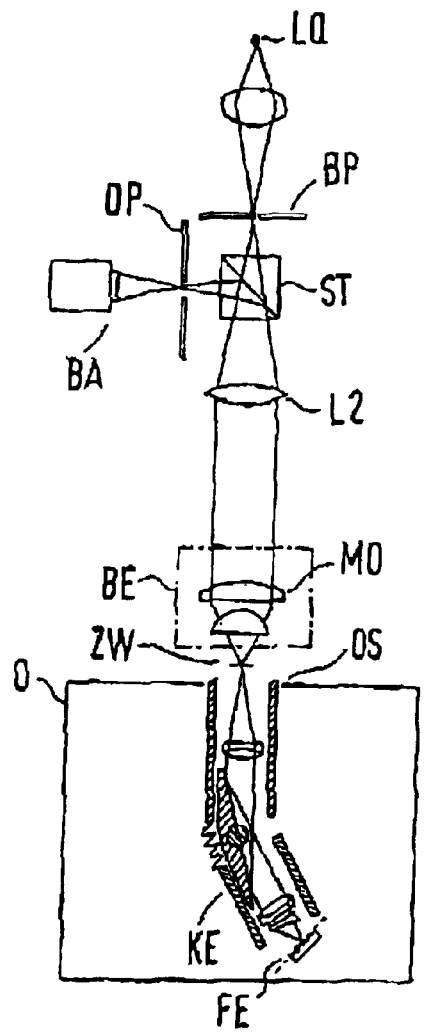
Figure 5C:
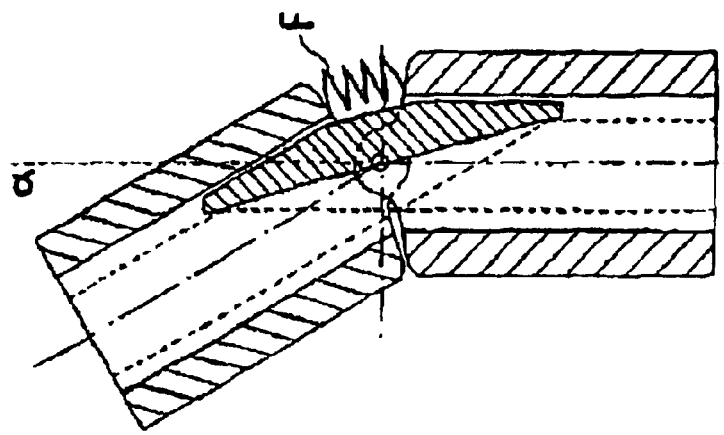
Figure 5B:
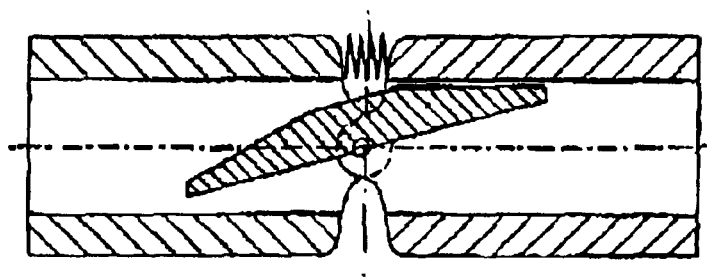
Figure 5A:
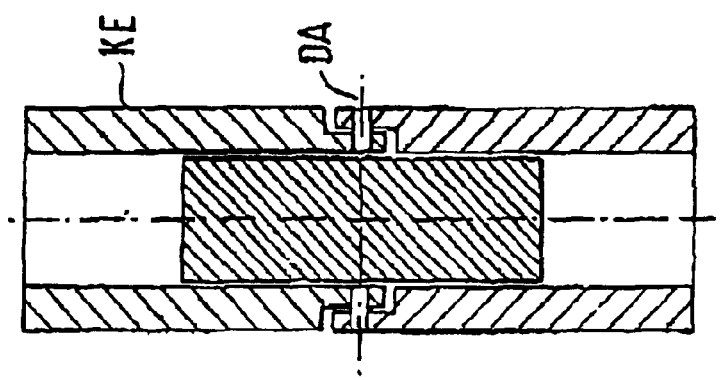
Figure 8:
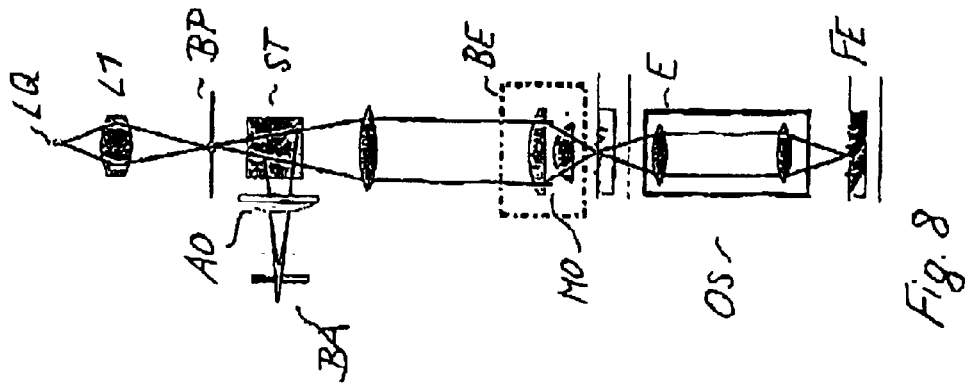
Figure 7:
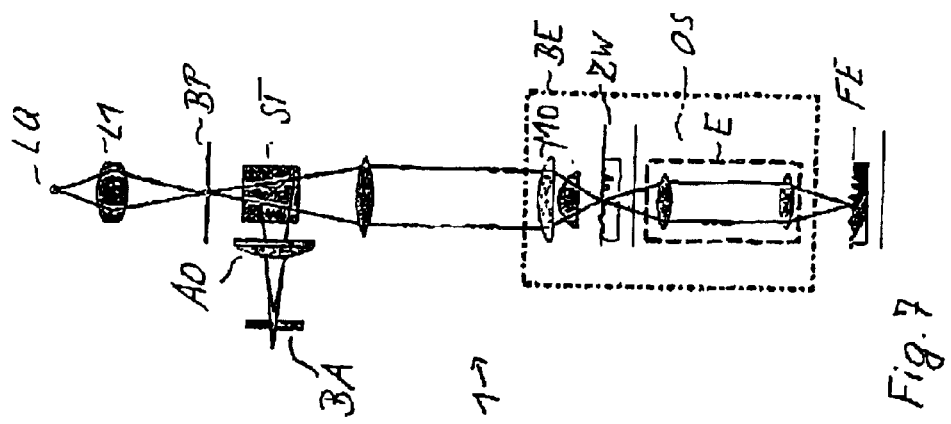
Figure 6:
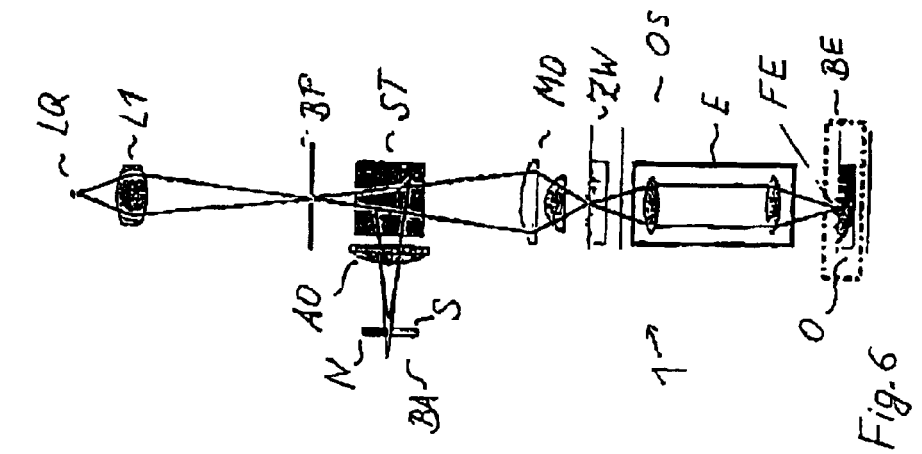
Figure 11:
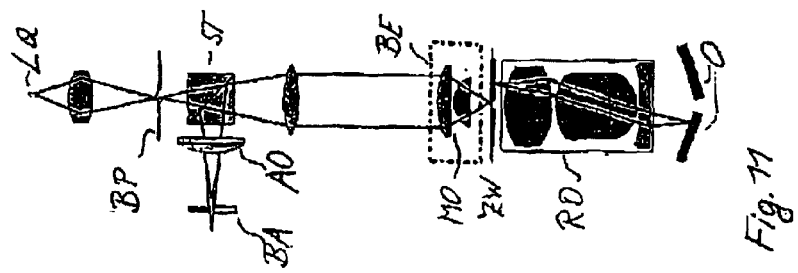
Figure 9:
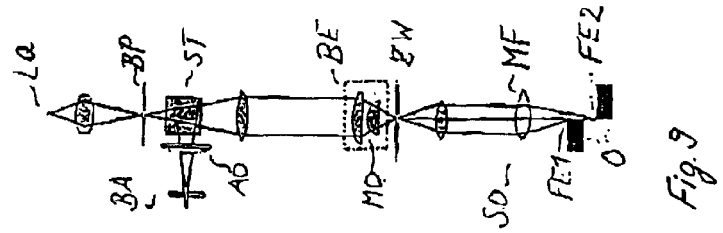
Figure 14A:
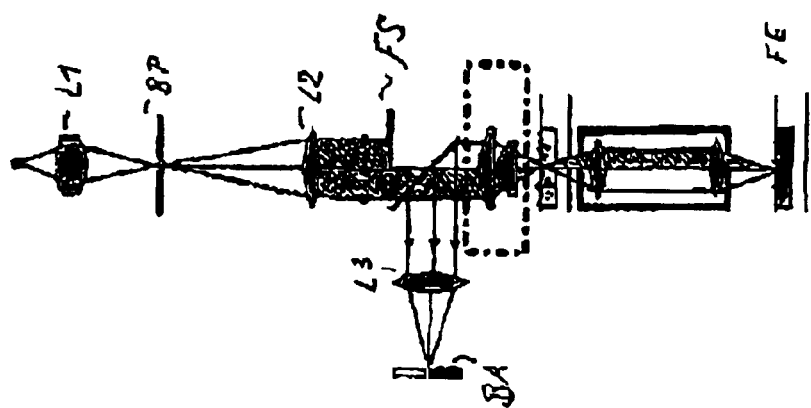
Figure 14B:
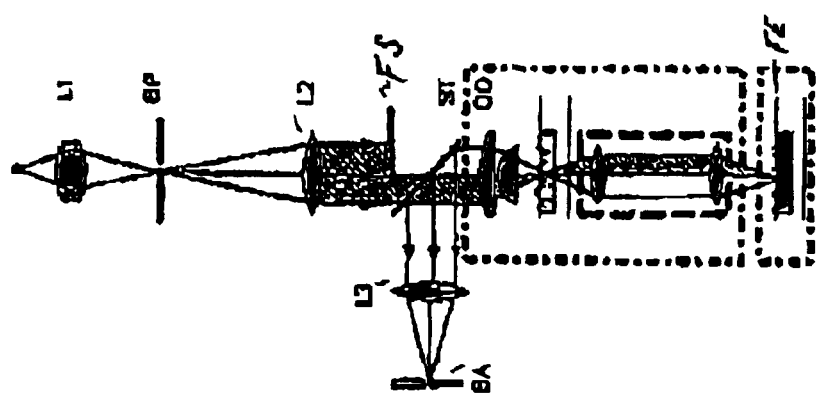

The present invention is elucidated in the following on the basis of exemplary embodiments, reference being made to the drawing, whose figures show:

FIG. 1 an optical measuring device having a confocal microscope and an optical probe having beam paths sketched in, in a side view, FIG. 2 a further exemplary embodiment of the optical measuring device, including another movable unit for depth scanning, FIG. 3 a further exemplary embodiment of the optical measuring device, FIGS. 4A and 4B an exemplary embodiment of the optical measuring device having an optical probe in the form of a folding endoscope in two different positions, FIGS. 5a), b) and c) the folding endoscope shown in FIGS. 4A and 4B, in an enlarged view from the front side, in a side view, and in a side view in the folded position, FIG. 6 a design of the optical measuring device having an autofocus system that includes an optical probe and the sketched-in beam paths in a lateral view, the test object acting as the movable unit, FIG. 7 a further exemplary embodiment of the optical measuring device having an autofocus system, one section of the measuring optics acting as the movable unit, FIG. 8 a further exemplary embodiment of the optical measuring device having an autofocus system, in which another section of the measuring optics is configured as the movable unit, FIG. 9 through FIG. 11 further exemplary embodiments of the optical measuring device, the measuring optics having different probe optics for measuring different surface areas, FIGS. 12A through 12C further exemplary embodiments of the optical measuring device, the measuring optics having a plurality of beam paths, and the detection unit having a plurality of partial units, FIGS. 13A through 13C a further exemplary embodiment of the optical measuring device, a plurality of measuring beam paths being formed using light of different wavelengths, and the detection unit having a plurality of partial units, and FIGS. 14A and 14B an exemplary embodiment of the optical measuring device in accordance with the principle of a Foucault laser, different sections of the measuring optics being configured as the movable unit.

EXEMPLARY EMBODIMENT

As is apparent from FIG. 1, optical measuring device 1 in one exemplary embodiment is made up of a confocal microscope, which is supplemented by an optical probe OS in the form of an endoscope E that generates an intermediate image ZW of a test object O. To scan test object O, this object is scanned in the direction of the optical axis, i.e., in the z-direction (depth direction), in that test object O is moved in the z-direction or in that endoscope E is moved, together with certain components of microscope objective M, in accordance with FIG. 2.

The underlying measuring system is a confocal microscope having a microscope optics MO. In the confocal microscope, surface structures of test object O situated outside of the focus in the region of a focal plane FE are suppressed. This is achieved, for example, in that the entire test object O is not simultaneously illuminated and imaged, but rather only one point at a time. For this purpose, confocal apertures are used, in the form of an illumination aperture BP disposed in an illumination light path and of a detection aperture DP disposed in a detection light path, at optically conjugate locations of the optical path. Light beams coming from outside the focus are suppressed by detection aperture DP.

A light source LQ, for example in the form of a coherent laser diode or an incoherent white light source, is focused, for example, using a lens L1 at illumination aperture BP. Test object O is illuminated by a patch of light (image of illumination aperture BP) by way of a beam splitter ST and through microscope objective MO, as well as through endoscope E. The patch of light is situated in focal plane FE of endoscope E. Focal plane FE of endoscope E is again imaged using endoscope E of optical probe OS into an intermediate image plane, as an intermediate image ZW. Intermediate image ZW is imaged by microscope objective MO, via beam splitter ST, into an image plane in which detection aperture DP is located. In this manner, the patch of light in focal plane FE is imaged via intermediate image ZW onto detection aperture DP, behind which is situated a photodiode, i.e., an image recorder BA, e.g., a CCD camera.

For purposes of 3D-measurement, in accordance with FIG. 1, the object surface is scanned (depth scan) in the depth direction (z-axis) by moving movable unit BE (indicated by a dot-dash line) in the form of test object O. In the exemplary embodiment shown in FIG. 2, movable unit (BE) (shown by a dot-dash line) includes components of microscope objective MO, as well as the optical probe having endoscope E. By moving movable unit BE in the z-direction (depth direction), the object surface is scanned.

If the object surface lies in focal plane FE, then the patch of light is imaged sharply via intermediate image ZW onto detection aperture DP, so that image recorder BA measures a high intensity signal. If, on the other hand, the surface lies outside of focal plane FE, then an unsharp image of the patch of light is formed on the detection plane, and image recorder BA measures a weak intensity signal. The intensity signal of image recorder BA exhibits a maximum when the object surface is situated in focal plane FE. Detection of the intensity maximum provides depth information on the measuring point. To scan the entire surface to be measured, the test object is also scanned in the xy-direction, for which, for example, the techniques mentioned at the outset may be used.

To scan the intermediate images, endoscope E does not have any mechanically rigid connection to the actual microscope objective MO. In accordance with the exemplary embodiment shown in FIG. 3, endoscope optics E is rigidly connected to test object O and generates an intermediate image ZW which is rigid relative to test object O. For the depth scanning, rigid intermediate image ZW is focused through focal plane FE of movable microscope objective MO as movable unit BE and, in this manner, scanned analogously to the actual test object O.

Endoscope optics E is preferably an optical system in a 4F configuration having the same linear magnification (e.g., β=1) for all object points.

FIGS. 4A, 4B, 5a), 5b) and 5c) depict a further exemplary embodiment of optical measuring device 1, endoscope E being designed as folding endoscope KE. Folding endoscope KE has two sections that are able to swing out about an axis of rotation DA running normally to the optical axis and, in its interior, it has a deflection mirror which deflects the beam inside folding endoscope KE in accordance with the folded position and directs it through the imaging elements. A spring F in the form of a compressing spring is used to swing the lower section (in the drawing) of folding endoscope KE, once it is led through a narrow channel to the inside of test object O, automatically in conformance with the inner object surface to be measured. In this context, folding endoscope KE may be designed to allow a settable swing angle α.

The two sections of folding endoscope KE are implemented by two tubes having tube axes that are directed relatively to one another in accordance with the folding position and are joined to one another by an articulation at axis of rotation DA. The endoscope optics is divided between the two tubes (e.g., objective lens in the one and eyepiece lens in the other tube). The two tubes are mechanically fabricated so as to permit the two tube axes to be oriented to one another both at 0° (folded-in state) as well as at the at least one rigid swing angle α (folded-out state). In the folded-in state, spring F is tensioned, in the folded-out state, it is released. In place of the mirror, prisms or gratings may also be provided as optical deflecting elements in the endoscope. To provide guidance when the endoscope is introduced into the inside of test object O, a bore in test object O itself or a separate guidance may be used. As illustrated in FIG. 4B, when endoscope E is introduced, the articulation lies freely inside test object O. In the folded-out state, the object surface is illuminated through folding endoscope KE by the patch of light, and this is imaged by way of intermediate image ZW onto image recorder BA. Scanning of the intermediate image renders possible a simple scanning of the object surface.

The optical measuring device described above having the measuring system configured as a confocal microscope can also in its measuring optics be furnished with a probe optics, as depicted in FIGS. 9, 10A, 10B, and 11 in connection with an autofocus system that is described in further detail below, and in other variations it is also possible to use a plurality of beam paths and assigned detection units, or even different illumination units BL, as depicted in FIGS. 12A through 12C, or 13A through 13C, also in connection with an autofocus system.

In the autofocus system, which is part of the equipment of optical measuring device 1 in accordance with the exemplary embodiment depicted in FIGS. 6 through 13C, an astigmatic optics AO is arranged between beam splitter FT and image recorder BA, in contrast to the confocal system. As is depicted in FIGS. 6 and in the following Figures, the observed object surface is illuminated in dots via illumination aperture BP and microscope optics MO. The detection takes place via beam splitter ST, astigmatic optics AO, and image recorder BA, which is configured having a plurality of photo elements for the surface resolution of the image produced on it, e.g., as a four-quadrant photo receiver CCD receiver arrangement, or as an arrangement made of a plurality of rows of photo elements. The patch of light on the observed object surface is imaged onto image recorder BA via microscope objective MO, beam splitter ST, and astigmatic optics AO, two focal lines perpendicular to each other forming at differing distances from the astigmatic optics, having a blur circle situated in between. By way of example, as astigmatic optics AO, a cylinder lens or torus lens is provided, which is designed so that for surface areas situated above focal plane FE, predominantly the photo elements oriented in the y-direction are illuminated, for example N and S of a four-quadrant photo diode, for surface areas situated below focal plane FE, predominantly photo elements O and W oriented in the x-direction are illuminated, and for surface areas situated in focal plane FE, all the photo elements are uniformly illuminated. The individual signals can be combined into evaluation signal N+S−O−W, which is in focal plane FE−O.

In this context, for three-dimensional measurement, the object surface in the depth axis (z-axis) is scanned through focal plane FE. If the observed surface area is in focal plane FE, then the light point of the surface is imaged as an unsharp circle on image recorder BA, or the four-quadrant photo diode, the evaluation signal is zero. If, on the other hand, the observed surface area lies outside focal plane FE, then the evaluation signal becomes positive or negative depending on the direction of the defocusing.

In accordance with FIGS. 1, 2, and 3, for scanning in the depth direction, object O, the section of the measuring optics having the optical probe and microscope optics MO, or only microscope optics MO can be moved. For example, the test object in the form of the test piece can be placed onto a piezo arrangement and the depth scan can thus be carried out.

If test piece O is illuminated by a patch of light, then it must still be scanned in the xy-direction, for which purposes procedures known from the related art, e.g., beam folding using oscillating mirrors, can be used.

As already described above in connection with the confocal measuring system, the measuring optics in the object beam path has an optical system, which generates an intermediate image. In FIGS. 6 through 8, an optical probe OS, that is configured as an endoscope E, is provided for this purpose, whereas, for example, different probe optics are depicted in FIGS. 9 through 11.

In the design having the autofocus system, it is also possible to carry out a scanning of intermediate image ZW in accordance with the description in connection with the confocal measuring system, as is shown, by way of example, in FIGS. 8, 9, 10A, 10B, 11 and 12A through 12C. For scanning the intermediate image, endoscope E does not have any mechanically rigid connection to the actual microscope objective MO. On the contrary, the endoscope optics can be rigidly joined to measuring object O, and then it produces an intermediate image that is rigid relative to the object, as, e.g., in accordance with the exemplary embodiment shown in FIG. 8. For the depth scan, microscope optics MO can focus on intermediate image ZW, and the optical system of endoscope E is preferably a 4F arrangement having the same linear magnification (e.g., β=1) for all object points.

FIG. 9 depicts the arrangement of a probe optics SO in the form of a superposition optics, which is configured as a multifocal optics MF, i.e., a bifocal optics, by the illumination through bifocal optics MF located in the object beam path, various spatially separated surfaces of the object are illuminated. The separated surface areas are imaged into one image field, preferably nearly into one common image surface. Then a common image arises. The common image can be imaged directly or via one or a plurality of intermediate images (common intermediate image ZW) astigmatically into the plane of image recorder BA in the form of the four-quadrant photo diode. Multifocal optics MF, i.e., the bifocal optics, has a lens that has a plurality of focal distances along one or a plurality of optical axes. Using additional lenses, the multifocal optics can be combined into one telecentric arrangement, to realize, e.g., the simultaneous reception of two nearly parallel surfaces, which are situated one over the other. The depth scan is carried out as described above.

Figure 10B:
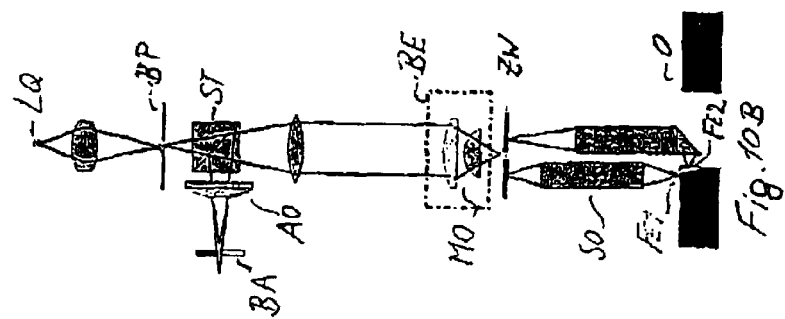
Figure 10A:
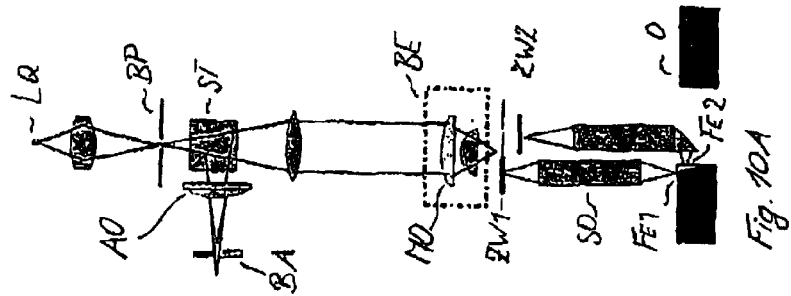

Alternatively, the superposition optics in accordance with FIGS. 10A, 10B, can also be composed of varying individual lens systems, which image different surfaces, along different optical axes and having different optical wavelengths, into one common intermediate image plane ZW, or different intermediate image planes ZW1, ZW2.

FIGS. 12A through 12C depict optical measuring device 1 having a detection unit that is made up of two partial units, each detection unit having image recorders BA1, BA2, and astigmatic optics AO1, AO2, to observe a plurality of surface areas simultaneously, whose images are located in different image planes. The surfaces in the different image planes can be measured simultaneously using the partial units, image recorders BA1, BA2 being arranged in different image planes. The different surfaces can be imaged onto image recorders BA1, BA2 via at least one intermediate image. In this context, it is advantageous if in each image plane a sharp patch of light is produced. This can be carried out via probe optics SO itself, through the use of a plurality of appropriate illumination apertures BP1, BP2 in accordance with FIG. 13A, or via an illumination unit BL having a plurality of optic fibers in accordance with FIG. 13B, a beam splitter ST3 being provided for coupling the light into the measuring beam path, and two further beam splitters ST1, ST2 being provided for the uncoupling into the partial units in both image recorders BA1, BA2. In addition, a sharp patch of light can be achieved in each image plane, also according to FIG. 13C, by using light of differing wavelengths. The depth scan is once again carried out as described in connection with the preceding exemplary embodiment.

One further probe optics SO is made up of a optics RO in accordance with FIG. 11. In this context, for scanning uneven surface areas, the surveillance optics is configured as an image-flattening optics, which brings about an even intermediate image ZW. In this manner, it is possible to observe and to measure surface areas in a cavity that are oriented in particular diagonally with respect to the optical axis. Using the configuration as a surveillance optics, it is possible to measure a radially symmetrical surface area that extends in a 360° circumference. The illumination of test object O is carried out through the image-flattening optics, i.e., the surveillance optics. Using the surveillance optics, for example, an annular section (360° in circumference) of the surface is imaged. The object surface can be imaged into one plane using surveillance optics RO, the flattened object then being generated. The flattened intermediate image can be imaged directly into the detection unit or via intermediate images.

In addition, the described autofocus system can be used in connection with folding endoscope KE, described above and depicted in FIGS. 4A through 5C.

On the other hand, the confocal measuring system in accordance with FIGS. 1 through 3 can also with the probe optics depicted in FIGS. 9 through 13C or with the detection units made of a plurality of partial units, astigmatic optics AO1, AO2 then being replaced by appropriate detection apertures, or also being used in connection with a plurality of illumination paths or with light of differing wavelengths λ1, λ2.

In the measuring device in accordance with the principle of the Foucault laser, which is part of the equipment of optical measuring device 1 in accordance with the exemplary embodiment depicted in FIGS. 14A through 14B, in contrast to current measuring systems, an aperture (Foucault knife edge) is arranged in the illumination light path in front of beam splitter ST. Microscope objective MO is configured as an objective optics OO. As depicted in FIGS. 14A and 14B, the observed object surface is illuminated in dots via illumination aperture BP, Foucault knife edge FS, objective optics OO, and the endoscope. The illumination is sent through the Foucault knife edge but not by fully using the entire cross-sectional surface of objective optics OO, but rather only using one section, which is preferably not symmetrical to the optical axis. The detection is carried out via endoscope E, objective optics OO, beam splitter ST, and a further optics L3, and image recorder BA, which is configured as having a plurality of photo elements for the surface resolution of the image generated in it, e.g., CCD receiver, differential diode. In this context, the object is imaged onto the image recorder, completely using the entire cross-sectional surface of the objective optics. As a result of this type of arrangement of the Foucault knife edge, varying intensity distributions are produced on the image recorder in accordance with the position of the object surface with respect to the focal plane.

If the observed surface area lies in the focal plane, then the light point of the surface is imaged symmetrically onto the image recorder, or the differential diode. If, on the other hand, the observed surface area lies outside of the focal plane, then the light point is imaged asymmetrically. Spatially, a difference arises in the intensity distribution. From this difference, the position of the surface area can be determined.

For three-dimensional measurement, in this context, the objective surface in the depth axis (z-axis) is scanned through the focal plane. According to FIGS. 14A and 14B, for scanning in the depth direction, object O, the section of the measuring optics having the optical probe and objective optics OO, or only objective optics OO is moved.

If test object O is illuminated using one patch of light, then it must still be scanned in the xy-direction, for which purpose procedures known from the related art, e.g., beam folding using oscillating mirrors, moving the object relative to the measuring system in the xy, etc., can be used.

What is claimed is:

1. An optical measuring device (1) for measuring the shape of a rough surface of a test object (O), comprising:
    at least one light source (LQ), one illumination optics, one measuring optics, and at least one detection unit having a detection element, for generating a focus on the surface, for imaging the focus reflected from the surface using the measuring optics onto the detection unit, and for determining the intensity distribution of the imaged focus on the detection element, such that the intensity distribution is a function of the focus position of the measuring optics relative to the surface, and from the determination of one or a plurality of different intensity distributions, the position or shape of the observed surface area is able to be determined be way of a signal evaluation,
    wherein the measuring optics includes an optical probe for generating at least one intermediate image (ZW) of an observed surface area;
    wherein the at least one intermediate image (ZW) is generated in the object beam path;
    wherein an optical unit (OST), which is rigid in relation to the test object (O), is located in the object beam path, and is followed on the side distant from the test object (O) by an optical unit (OBW) which is movable in relation to the test object (O), in the direction of its optical axis; and
    wherein the at least one intermediate image (ZW), which is rigid in relation to the test object (O), is generated by the rigid optical unit (OST) normally to the optical axis, and the movable optical unit (OBW) is positioned in the reflected object beam behind the at least one intermediate image (ZW), and is configured to scan the at least one intermediate image (ZW).

2. The measuring device as recited in claim 1, wherein the optical probe (OS) is arranged on the object side of an objective optics (OO).

3. The measuring device as recited in claim 1, wherein the optical probe (OS) has an optical system which is designed as a microscope objective (MO).

4. The measuring device as recited in claim 1, wherein an illumination aperture (BP) is provided, and the optical probe (OS) images the illumination aperture (BP) in its focal plane (FE).

5. The measuring device as recited in claim 4, wherein the rigid optical unit (OST) is part of an optical system that generates the intermediate image or an additional intermediate image (ZW).

6. The measuring device as recited in claim 1, wherein the rigid optical unit (OST) has wavefront-deforming elements.

7. The measuring device as recited in claim 1, wherein the rigid optical unit (OST) is designed fully or partially as an endoscope (E).

8. The measuring device as recited in claim 1, wherein the movable optical unit (OBW) is made fully or partially of optical elements which are movable in the direction of the optical axis.

9. The measuring device as recited in claim 1, wherein the movable optical unit (OBW) is situated fully outside of, partially inside and outside of, or fully inside of the object's light path.

10. The measuring device as recited in claim 1, wherein the intermediate-imaging device has the same linear magnification for all object points imaged in the rigid intermediate image.

11. The measuring device as recited in claim 1, wherein the intermediate-imaging device is designed as a telecentric imaging device in a 4F configuration.

12. The optical measuring device as recited in claim 1, wherein a confocal system of apertures is provided having an illumination aperture (BP) and a detection aperture (DP), which are positioned at optically conjugate locations of the beam path of the illumination optics and of the detection unit;
    as a function of the focus position relative to the surface, varying local intensity distributions arise on the detection element; and
    the position or shape of the observed surface area is able to be determined from the varying intensity distributions by way of a signal evaluation unit of the detection unit.

13. The measuring device as recited in claim 12, wherein the optical probe (OS) also images the detection aperture (DP) in the focal plane (FE).

14. The measuring device as recited in claim 1, wherein the detection unit has an astigmatic optics (AO) for generating an astigmatic image of the observed object surface on the receiver surface of the detection unit;
    the astigmatic optics (AO) is designed and positioned such that varying local intensity distributions arise on the receiver surface as a function of the focus position relative to the object surface; and
    the position or shape of the observed surface area is able to be determined from the varying local intensity distributions by way of a signal evaluation unit of the detection unit.

15. The measuring device as recited in claim 14, wherein the astigmatic optics (AO) has a cylinder lens or torus lens, and the receiver surface is a four-quadrant photo diode or an image recorder having an areal arrangement of image recording elements or an image recording arrangement made of a plurality of rows of image recorders, and the arrangement of the astigmatic optics (AO) and the receiver surface is designed such that, for a focal plane situated in front of the observed surface area, a first orientation of the intensity distribution results, for a focal plane situated behind the observed surface area, a second orientation of the intensity distribution results, and, for a focal plane situated in the observed surface area, a balanced intensity distribution results.

16. The measuring device as recited claim 1, wherein the measuring optics has an image-flattening optics for generating a flattened intermediate image of at least one uneven surface area.

17. The measuring device as recited in claim 16, the image-flattening optics is designed as a panoramic optics (RO) for covering a radially symmetric surface area that encircles 360°.

18. The measuring devices as recited in claim 1, wherein, to determine the position and shape of the observed surface area, a relative change in the position of the focal plane with respect to the object surface is carried out in the z-direction, either by moving the test object (O) relative to the measuring device (1) or by moving the objective optics having the optical probe relative to the surface, or by moving the objective optics as the movable optical unit (OBW) relative to the surface and to the optical probe (OS) as the rigid optical unit (OST).

19. An optical measuring device (1) for measuring the shape of a rough surface of a test object (O), comprising:
    at least one light source (LQ), one illumination optics, one measuring optics, and at least one detection unit having a detection element, for generating a focus on the surface, for imaging the focus reflected from the surface using the measuring optics onto the detection unit, and for determining the intensity distribution of the imaged focus on the detection element, such that the intensity distribution is a function of the focus position of the measuring optics relative to the surface, and from the determination of one or a plurality of different intensity distributions, the position or shape of the observed surface area is able to be determined be way of a signal evaluation, wherein the measuring optics includes an optical probe for generating at least one intermediate image (ZW) of an observed surface are, and wherein the optical probe (OS) has at least two sections which are able to swing out relative to one another about an axis, transversely to the optical axis, or be displaced relative to one another, transversely to the optical axis, and be arrested in a swing or displacement position.

20. An optical measuring device (1) for measuring the shape of a rough surface of a test object (O), comprising:

at least one light source (LQ), one illumination optics, one measuring optics, and at least one detection unit having a detection element, for generating a focus on the surface, for imaging the focus reflected from the surface using the measuring optics onto the detection unit, and for determining the intensity distribution of the imaged focus on the detection element, such that the intensity distribution is a function of the focus position of the measuring optics relative to the surface, and from the determination of one or a plurality of different intensity distributions, the position or shape of the observed surface area is able to be determined be way of a signal evaluation, wherein the measuring optics includes an optical probe for generating at least one intermediate image (ZW) of an observed surface area, and wherein the measuring optics has a superposition optics (SO), which is used to illuminate and image spatially separated surface areas of the test object (O), as intermediate images (ZW, ZW1, ZW2), into one image field of one common intermediate image plane or into image fields of different intermediate image planes.

21. The measuring device as recited in claim 20, wherein the superposition optics (SO) is made up of different individual lens systems, which image the spatially separated surface areas, along different optical axes and/or different optical pathlengths, into the common intermediate image plane, or the superposition optics (SO) has a multifocal optics (MF) which includes a lens having a plurality of focal distances along one or a plurality of optical axes, and which images the spatially separated surface areas into the common intermediate image plane.

22. The measuring device as recited in claim 20, wherein a plurality of detection units is provided in tuned, different image planes, each having astigmatic optics (AO1, AO2) and each having image recorders (BA1, BA2).

23. The measuring device as recited in claim 20, wherein a plurality of illumination light paths is provided with a plurality of illumination apertures (BP1, BP2) and/or with light of differing wavelengths.

24. An optical measuring device (1) for measuring the shape of a rough surface of a test object (O), comprising:

at least one light source (LQ), one illumination optics, one measuring optics, and at least one detection unit having a detection element, for generating a focus on the surface, for imaging the focus reflected from the surface using the measuring optics onto the detection unit, and for determining the intensity distribution of the imaged focus on the detection element, such that the intensity distribution is a function of the focus position of the measuring optics relative to the surface, and from the determination of one or a plurality of different intensity distributions, the position or shape of the observed surface area is able to be determined be way of a signal evaluation, wherein the measuring optics includes an optical probe for generating at least one intermediate image (ZW) of an observed surface area, wherein the optical probe (OS) is arranged on the object side of an objective optics (OO), wherein the illumination light path contains an aperture (FS), which effects that, for the illumination of the object (O), not the entire diameter of the objective optics (OO) is irradiated, but the entire diameter of the objective optics (OO) is irradiated when the object (O) is imaged onto the receiver surface of the detection unit;

the aperture (FS), in this context, is designed and positioned such that varying local intensity distributions arise on the receiver surface as a function of the focus position relative to the objective surface; and the position or shape of the observed surface area is able to be determined from the varying local intensity distributions by way of a signal evaluation unit of the detection unit.

25. The measuring device as recited in claim 24, wherein the aperture is designed as a Foucault knife edge (FS).

26. The measuring device as recited in claim 24, wherein the receiver surface is an image recorder having an areal arrangement of image recorder elements, a four-quadrant photo diode, or a differential diode; and the arrangement is designed such that, for a focal plane situated in front of the observed surface area, a first orientation of the intensity distribution results, for a focal plane situated behind the observed surface area, a second orientation of the intensity distribution results, and for a focal plane situated in the observed surface area, a balanced intensity distribution results.

\* \* \* \* \*

UNITED STATES PATENT AND TRADEMARK OFFICE
CERTIFICATE OF CORRECTION

PATENT NO. : 6,940,610 B2  
APPLICATION NO. : 10/145523  
DATED : September 6, 2005  
INVENTOR(S) : Friedrich Prinzhausen et al.

Page 1 of 1

It is certified that error appears in the above-identified patent and that said Letters Patent is hereby corrected as shown below:

<u>Column 12,</u>
Line 50, change "claim 16, the" to -- claim 16, wherein the --.

<u>Column 13,</u>
Line 35, change "determined be way" to -- determined by way --.

<u>Column 14,</u>
Line 29, change "determined be way" to -- determined by way --.

Signed and Sealed this

Twentieth Day of June, 2006

JON W. DUDAS
*Director of the United States Patent and Trademark Office*